US007486751B1

(12) United States Patent
Pare, Jr. et al.

(10) Patent No.: US 7,486,751 B1
(45) Date of Patent: Feb. 3, 2009

(54) JOINT TIME/FREQUENCY DOMAIN MAXIMUM RATIO COMBINING ARCHITECTURES FOR MULTI INPUT MULTI OUTPUT WIRELESS RECEIVERS

(75) Inventors: Thomas Edward Pare, Jr., Mountain View, CA (US); Shuling Feng, San Jose, CA (US); Chien-Cheng Tung, Fremont, CA (US)

(73) Assignee: Ralink Technology, Inc., Cupertino, CA (US)

( * ) Notice: Subject to any disclaimer, the term of this patent is extended or adjusted under 35 U.S.C. 154(b) by 795 days.

(21) Appl. No.: 11/048,075

(22) Filed: Jan. 31, 2005

Related U.S. Application Data

(63) Continuation-in-part of application No. 10/782,351, filed on Feb. 18, 2004, now Pat. No. 7,369,626, and a continuation-in-part of application No. 10/797,299, filed on Mar. 9, 2004, now Pat. No. 7,245,677.

(51) Int. Cl.
*H04B 7/10* (2006.01)
(52) U.S. Cl. .................. 375/347; 375/260; 375/323
(58) Field of Classification Search ................. 375/316, 375/347, 260, 322, 323, 334
See application file for complete search history.

(56) References Cited

U.S. PATENT DOCUMENTS 7,019,595 B1   3/2006  Lo et al.
7,197,094 B2   3/2007  Tung
7,245,677 B1   7/2007  Pare, Jr.
7,248,650 B1   7/2007  Tung et al.
7,266,146 B2   9/2007  Pare, Jr. et al.

*Primary Examiner*—Kevin Y Kim
(74) *Attorney, Agent, or Firm*—Law Offices of Iman

(57) ABSTRACT

A multi input multi output (MIMO) receiver for receiving signals having a synchronization (SYNC) module being responsive to a plurality of received baseband signals for processing the same to generate maximum ratio combining (MRC) parameters, complementary code keying (CCK) modulated signals and orthogonal frequency division multiplexing (OFDM) modulated signals, said SYNC module for using said MRC parameters to process said OFDM modulated signals to generate a plurality of aligned OFDM signals in time domain, said MIMO receiver for processing said plurality of aligned OFDM signals to generate a plurality of subcarriers, in accordance with an embodiment of the present invention. The MIMO receiver further including a time domain CCK MRC module being responsive to said MRC parameters for processing said CCK modulated signals in time domain to generate aligned signals, said aligned signals being combined to generate an adjusted signal for demodulation. The MIMO receiver further including a frequency domain OFDM MRC module being responsive to said plurality of said subcarriers for combining the same in the frequency domain to generate an equalized response for demodulation, wherein said MIMO receiver for processing said CCK modulated signals in the time domain and said OFDM modulated signals in the frequency domain to improve the reception of said plurality of received baseband signals.

21 Claims, 7 Drawing Sheets

JOINT TIME/FREQUENCY DOMAIN MAXIMUM RATIO COMBINING ARCHITECTURES FOR MULTI INPUT MULTI OUTPUT WIRELESS RECEIVERS

CROSS REFERENCE TO RELATED APPLICATIONS

This application is a continuation-in-part of U.S. patent application Ser. No. 10/782,351 filed on Feb. 18, 2004, now U.S. Pat. No. 7,369,626 and entitled "EFFICIENT SUB-CARRIER EQUALIZATION TO ENHANCE RECEIVER PERFORMANCE" and a continuation-in-part of U.S. patent application Ser. No. 10/797,299 filed on Mar. 9, 2004, now U.S. Pat. No. 7,245,677 and entitled "AN EFFICIENT METHOD FOR MULTI-PATH RESISTANT CARRIER AND TIMING FREQUENCY OFFSET DETECTION" which are incorporated herein by reference as though set forth in full.

BACKGROUND OF THE INVENTION

1. Field of the Invention

The present invention relates generally to the field of multi input multi output receivers and particularly to a method and apparatus for using maximum ratio combining receiver architectures for processing time and frequency domain signals.

2. Description of the Prior Art

As computers have gained enormous popularity in recent decades, so have networking the same allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11a or 802.11g industry standard, are commonly employed. That is, an antenna is placed inside or nearby the personal computer and an RF chip receives signal or data through the antenna and an analog-to-digital converter, typically located within the personal computer (PC), converts the received signal to baseband range. Thereafter, a baseband processor is employed to process and decode the received signal to the point of extracting raw data, which may be files transferred remotely and wireless, from another PC or similar equipment with the use of a transmitter within the transmitting PC.

There are several prior art apparatus and techniques for implementing 802.11a/g modem receivers, however, such prior art have not successfully utilized the fullest potential of the 802.11a/g modem. For example, the maximum rate of this type of modem device is 54 Mbits/sec, but in the presence of multi-path channel, use of current prior art methods and apparatus does not allow for reception of data at such rates. In fact, successful reception of data under multi-path channel conditions currently takes place at lower rates or may fail altogether.

To improve reception of data at higher rates wireless receivers often employ multiple antennae. In the design of multi input multi output (MIMO) transceivers new technical challenges such as the requirement to combine multiple channels emerge. Conventional 802.11g compliant receivers decode data modulated in both the time (complementary code keying (CCK)) and frequency domains (orthogonal frequency division multiplexing (OFDM)).

Conventional approaches to multi antennae receiver designs include maximum antenna approach wherein the antenna with maximum received signal power is chosen for reception. Other conventional approaches include an all time domain design which is a stand-alone module but does not allow the advantage of frequency domain combining that is more suitable for OFDM processing. The all time domain design also has the disadvantage of having a costly implementation in terms of silicon die area. Moreover, a design restricted to frequency domain, which benefits OFDM reception, does not necessarily improve the CCK receiving portion of the receiver. Thus, it is desirable to develop a method and apparatus for multi antennae receivers that offers improved performance over the conventional designs without incurring substantially higher costs.

SUMMARY OF THE INVENTION

Briefly, an embodiment of the present invention includes a multi input multi output (MIMO) receiver for receiving signals having a synchronization (SYNC) module being responsive to a plurality of received baseband signals for processing the same to generate maximum ratio combining (MRC) parameters, complementary code keying (CCK) modulated signals and orthogonal frequency division multiplexing (OFDM) modulated signals, said SYNC module for using said MRC parameters to process said OFDM modulated signals to generate a plurality of aligned OFDM signals in time domain, said MIMO receiver for processing said plurality of aligned OFDM signals to generate a plurality of subcarriers. The MIMO receiver further including a time domain CCK MRC module being responsive to said MRC parameters for processing said CCK modulated signals in time domain to generate aligned signals, said aligned signals being combined to generate an adjusted signal for demodulation. The MIMO receiver further including a frequency domain OFDM MRC module being responsive to said plurality of said subcarriers for combining the same in the frequency domain to generate an equalized response for demodulation, wherein said MIMO receiver for processing said CCK modulated signals in the time domain and said OFDM modulated signals in the frequency domain to improve the reception of said plurality of received baseband signals.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 1:
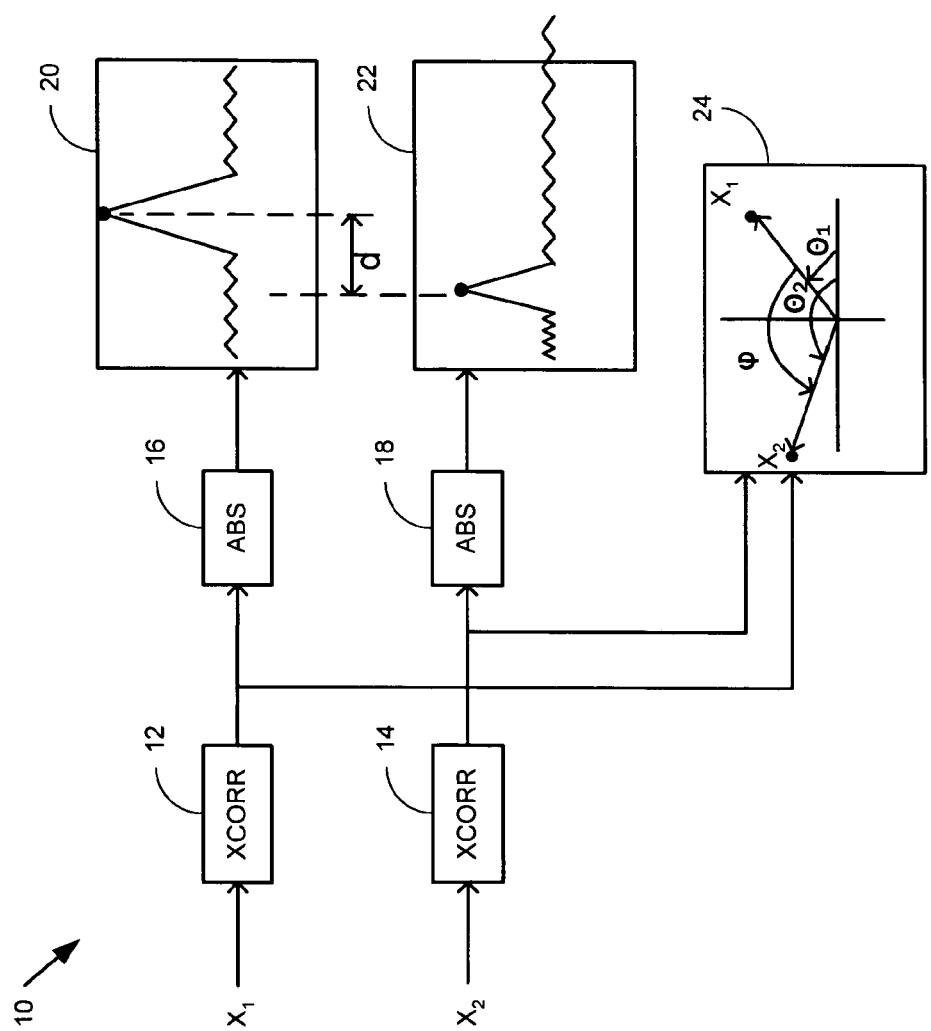
FIG. 1 shows a functional diagram of some of the functions performed by a joint time/frequency domain maximum ratio combining (MRC) multi input multi output (MIMO) receiver, in accordance with an embodiment of the present invention.

Referring now to FIG. 1, a functional diagram of some of the functions performed by a joint time/frequency domain maximum ratio combining (MRC) multi input multi output (MIMO) receiver 10 is shown to include a first cross-correlator 12, a second cross correlator 14, a first absolute value (ABS) module 16, a second ABS module 18, two magnitude indicator modules 20 and 22, and a phase indicator module 24.

The cross correlator 12 is coupled to the ABS module 16 and the phase indicator module 24 while the cross correlator 14 is coupled to the ABS module 18 and the phase indicator module 24. The ABS module 16 is coupled to the magnitude indicator module 20 while the ABS module 18 is coupled to the magnitude indicator module 22.

The MIMO receiver 10 is a 1 transmitter 2 receiver (1T2R) system wherein a signal is transmitted and is received by two antennae. High data rate wireless receivers often employ multiple antennae to improve reception of the incoming signals by optimizing the signal to noise ratio (SNR). For the MIMO receiver 10 the two received baseband signals are $X_1$ and $X_2$ which are processed by the cross correlators 12 and 14, respectively.

Conventional 802.11g compliant receivers decode data modulated in both the time domain, complementary code keying (CCK), and the frequency domain, orthogonal frequency division multiplexing (OFDM). The cross correlators 12 and 14 determine whether the received baseband signals $X_1$ and $X_2$ are of the CCK or OFDM type. Subsequently, the 2 received baseband signals are aligned in the time domain by first determining the absolute value or magnitude of the received baseband signal $X_1$, represented by a complex scalar, in the ABS module 16. The magnitude of $X_1$ is shown plotted as a function of time in the magnitude indicator module 20. Similarly, the absolute value of the complex-valued received baseband signal $X_2$ is determined in the ABS module 18 which is shown plotted as a function of time in the magnitude indicator module 22.

The time offset d between peak locations of the magnitudes of $X_1$ and $X_2$ shown in the magnitude indicator modules 20 and 22 is computed. For time alignment, the time offset d is corrected by advancing or delaying, i.e. translating, one received baseband signal with respect to the other. Thus, the CCK and OFDM modulated signals, included within the received baseband signals, are time aligned in the time domain.

The phase offset between the two CCK modulated signals is corrected by computing the angle φ therebetween and applying the negative of φ to one of the signals. Specifically, if a CCK modulated signal $X_1$ with the largest magnitude $R_1$ is denoted by $R_1 \exp(j\theta_1)$ and a CCK modulated signal $X_2$ with the largest magnitude $R_2$ is denoted by $R_2 \exp(j\theta_2)$, then φ is computed according to $$\phi = \mathrm{angle}(X_2 X_1^*) = \theta_2 - \theta_1,$$

where the asterisk represents complex conjugation. Phase adjustment of the OFDM modulated signals is performed in the frequency domain on a subcarrier by subcarrier basis, as discussed in detail hereinbelow.

Figure 2:
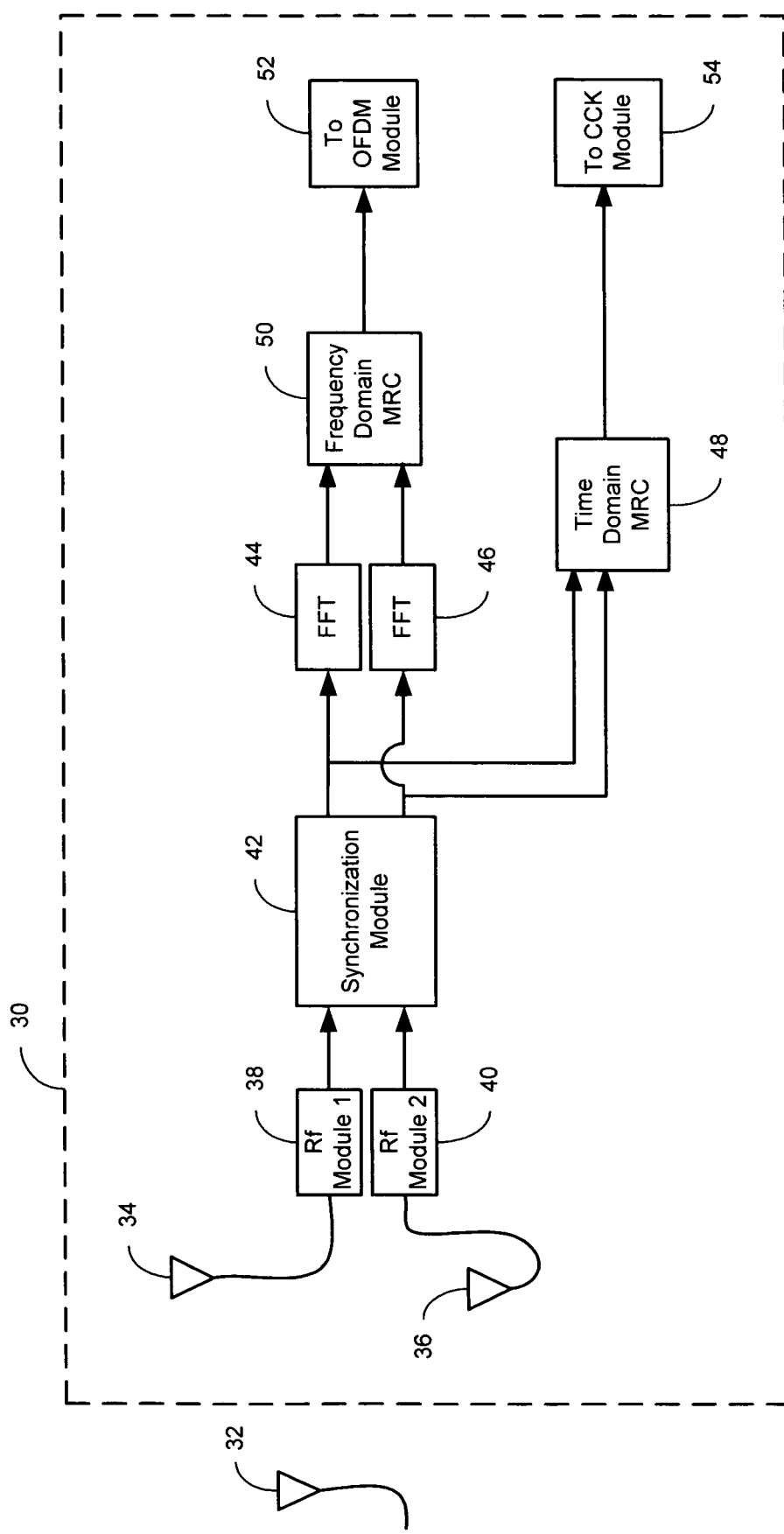
FIG. 2 shows a joint time/frequency domain MRC architecture for a MIMO receiver, in accordance with an embodiment of the present invention.

Referring now to FIG. 2, a joint time/frequency domain MRC architecture for an MIMO receiver 30 is shown, in accordance with an embodiment of the present invention. Also shown in FIG. 2 is a transmitter antenna 32 for transmitting signals to the receiver 30. The MIMO receiver 30 includes two receiving antennae 34 and 36, two radio frequency (RF) modules 38 and 40, a synchronization (SYNC) module 42, two fast Fourier transform (FFT) modules 44 and 46, a frequency domain OFDM MRC module 50, an OFDM module 52, a time domain CCK MRC module 48, and a CCK module 54.

The receiving antennae 34 and 36 are coupled to the RF modules 38 and 40, respectively, which are coupled to the SYNC module 42. The SYNC module 42 is coupled to the two FFT modules 44 and 46 and the time domain CCK MRC module 48 which is coupled to the CCK module 54. The FFT modules 44 and 46 are coupled to the frequency domain OFDM MRC module 50 which is coupled to the OFDM module 52.

The signal transmitted by the antenna 32 is received by the receiving antennae 34 and 36, each of which processes a received signal. The RF modules 38 and 40 convert the received signals to received baseband signals which are transferred to the SYNC module 42. The SYNC module 42 aligns the OFDM modulated signals, included in the received baseband signals, in time domain to generate two aligned OFDM signals. The SYNC module 42 also computes the MRC parameters for the time domain CCK modulated signals included in the received baseband signals. Accordingly, the SYNC module 42 controls the MRC processing for both time domain and frequency domain data paths.

Specifically, the SYNC module 42 computes the MRC parameters for the CCK modulated signals including the time offset d between peak locations of the signals. Also computed is the phase offset φ for phase adjustment of the CCK modulated signals as described hereinabove. The MRC parameters are transferred to the time domain CCK MRC module 48. The SYNC module 42 also uses the time offset d to align the two OFDM modulated signals in time domain to generate two aligned OFDM signals which are transferred to the FFT modules 44 and 46.

The MIMO receiver 30 performs phase adjustment of the OFDM modulated signals in the frequency domain as part of the equalization process. This is because OFDM modulation is inherently broadband and channel conditions may vary across the spectrum. Thus, it is advantageous to combine the OFDM modulated signals on the basis of each subcarrier using varying MRC parameters optimized for each subcarrier. Such an approach allows the MIMO receiver 30 to naturally select the best channel conditions among the received baseband signals. Accordingly, combining of the OFDM modulated signals is performed in the frequency domain as described hereinbelow.

The IEEE 802.11g standard requires capabilities to process both CCK and OFDM modulated signals. In the embodiment of the present invention shown in FIG. 2, in order to apply the benefits of MRC signal combining for 802.11g receivers with multiple antennae, both time and frequency domain combining are performed. In this way, the joint time/frequency domain MRC architecture for the MIMO receiver 30 nearly optimizes the performance of a multi-antennae receiver. Although the embodiment of the present invention shown in FIG. 2 is for a 1-transmitter 2-receiver (1T2R) system, in alternative embodiments of the present invention there are more then 1 transmitter and 2 receivers.

The time domain CCK MRC module 48 applies the time offset and the phase offset to the CCK modulated signals in time domain to generate aligned signals. The aligned signals are combined to generate an adjusted signal which is transferred to the CCK module 54 for demodulation.

The FFT modules 44 and 46 perform 64-point FFT converting the 64 time domain samples in each of the two aligned OFDM signals into 64 frequency domain subcarriers which comprise one data symbol. Both sets of subcarriers are transferred to the frequency domain OFDM MRC module 48. The frequency domain OFDM MRC module 48 performs phase adjustment in the frequency domain as part of the equalization process to combine the subcarriers.

Specifically, for the MIMO receiver 30, with two received signals, there are two channel estimates for each subcarrier, that is $$H_i = [h^1 h^2]_i^T,$$

where T stands for the transpose of the 1×2 matrix and the subscript i stands for the $i^{th}$ subcarrier. The corresponding equalizer coefficient is $$F_i = H_i^*/|H_i|^2 = (|h^1|^2 + |h^2|^2)^{-1} [h^{1*} h^{2*}] = [Z^1 Z^2].$$

If the $i^{th}$ subcarrier of the two signals are denoted by $y^1$ and $y^2$ then the equalized response for the $i^{th}$ subcarrier is $$F_i [y^1 y^2]_i^T = (Z^1 y^1 + Z^2 y^2)_i$$

where i=1, ..., 52 for each of the subcarriers. Thus, if a signal is deeply faded the effect thereof on the equalized response is de-emphasized and vice versa, i.e., channel information is being used in the MRC processing of the OFDM modulated signals. It is also noted that an efficient method to weight the Vitebri metrics for data decoding is discussed in the U.S. patent application Ser. No. 10/782,351 filed on Feb. 18, 2004 and referred to hereinabove. The Vitebri weighting method may be extended to the MIMO receiver 30 by simply using the sum of the magnitudes, i.e., $(|h^1|^2 + |h^2|^2)_i$, i=1, ..., 52.

The frequency domain OFDM MRC module 50 generates an equalized response that is transferred to the OFDM module 52 for demodulation.

The MIMO receiver 30, shown in FIG. 2, includes a processor (not shown), or computer medium, some type of storage area and a computer readable medium, for storing the software/firmware described in FIG. 2. The processor executes codes from the computer readable medium for effectuating the functions outlined in FIG. 2.

Figure 3:
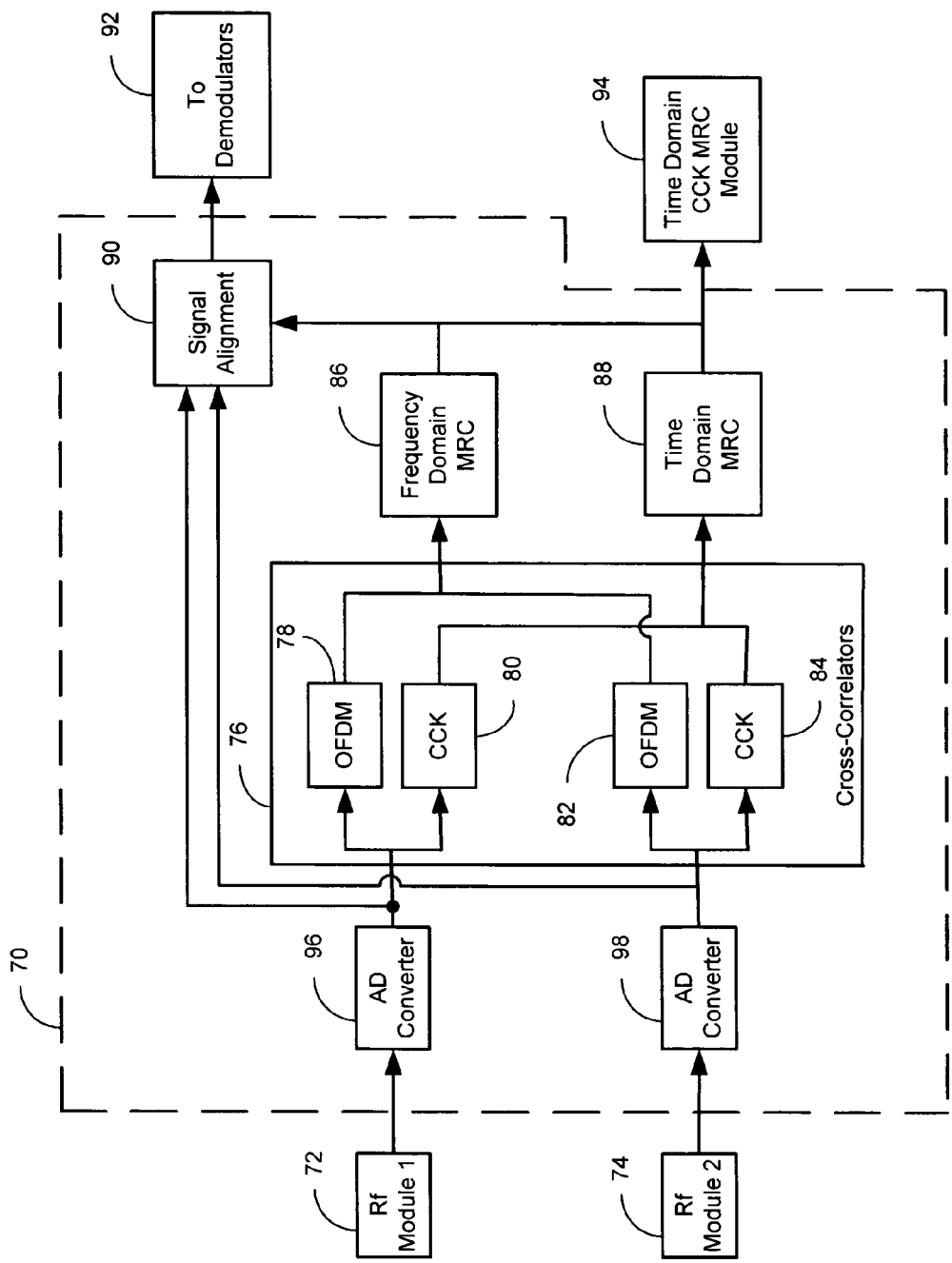
FIG. 3 shows a synchronization (SYNC) module, in accordance with an embodiment of the present invention.

Referring now to FIG. 3, a SYNC module 70 is shown to include two cross correlators 76, a frequency domain MRC module 86, a time domain MRC module 88, a signal alignment module 90, and two analog to digital (AD) converters 96 and 98, in accordance with an embodiment of the present invention. Also shown in FIG. 3 are two RF modules 72 and 74, a demodulator 92, and a time domain CCK MRC module 94.

The RF modules 72 and 74 are coupled to the AD converters 96 and 98, respectively which are coupled to the cross correlators 76 and the signal alignment module 90. Specifically, the AD converter 96 is coupled to the OFDM module 78 and the CCK module 80 while the AD converter 98 is coupled to the OFDM module 82 and the CCK module 84. The OFDM modules 78 and 82 are coupled to the frequency domain MRC module 86 and the CCK modules 80 and 84 are coupled to the time domain CCK module 88 which is coupled to the signal alignment module 90 and the time domain CCK MRC module 94. The frequency domain MRC module 86 is coupled to the signal alignment module 90 which is coupled to the demodulator 92.

The received baseband signals are the input to the AD converters 96 and 98 where the signals are converted to two digital input signals. The cross correlators 76 distinguish between the CCK and OFDM modulated signals so that OFDM modulated signals are received by the OFDM modules 78 and 82 while the CCK modulated signals are received by the CCK modules 80 and 84. The outputs of the CCK modules 80 and 84 are transferred to the time domain MRC module 88 and the outputs of the OFDM modules 78 and 82 are transferred to the frequency domain MRC module 86.

The time domain MRC module 88 computes the time offset d and the phase angle φ which are transferred to the time domain CCK MRC module 94. The time offset and the output of the frequency domain MRC module 86 and the output of the frequency domain MRC module 86 are transferred to the signal alignment module 90. The signal alignment module 90 also receives the digital input signals wherein the time offset is used to align the OFDM modulated signals as described hereinabove. The signal alignment module 90 generates aligned OFDM signals that are transferred to the demodulator 92 for demodulation.

Another function of the time domain MRC module 88 is gain scaling based on the independent automatic gain control (AGC) settings of the analog RF amplifiers. That is, each of the RF modules 72 and 74 has an independent AGC setting denoted by $G_1$ and $G_2$, respectively, unlike some receivers where only a single AGC setting is used for all the receivers. Independent AGC settings enable the MIMO receiver 30 to use better quality channel information when available by allowing each receiver to use the full dynamic range of the AD converters.

For gain scaling two MRC weights $W_1$ and $W_2$ based on $G_1$ and $G_2$ are computed according to $$W_1 = G_2/(G_1 + G_2),$$

$$W_2 = G_1/(G_1 + G_2).$$

Through the MRC weights, channel quality information may be used. For example, if channel 2 is severely faded indicating the data on channel 2 to be less reliable then the gain $G_2$ will need to be large. In such a case, the above relations indicate that the channel 1 MRC weight $W_1$ is relatively large for the better quality channel. The quantity $(G_1 + G_2)$ serves to normalize the gains analogous to the quantity $(|h^1|^2 + |h^2|^2)$ used for the MRC equalizer coefficients. The division by $(G_1 + G_2)$ may be avoided by using a look-up table based on the known AGC settings. In other embodiments of the present invention weights similar to MRC weights are applied to the OFDM modulated signal to further optimize the performance of the MIMO receiver. The MRC weights are transferred to the time domain CCK MRC module 94.

Figure 4:
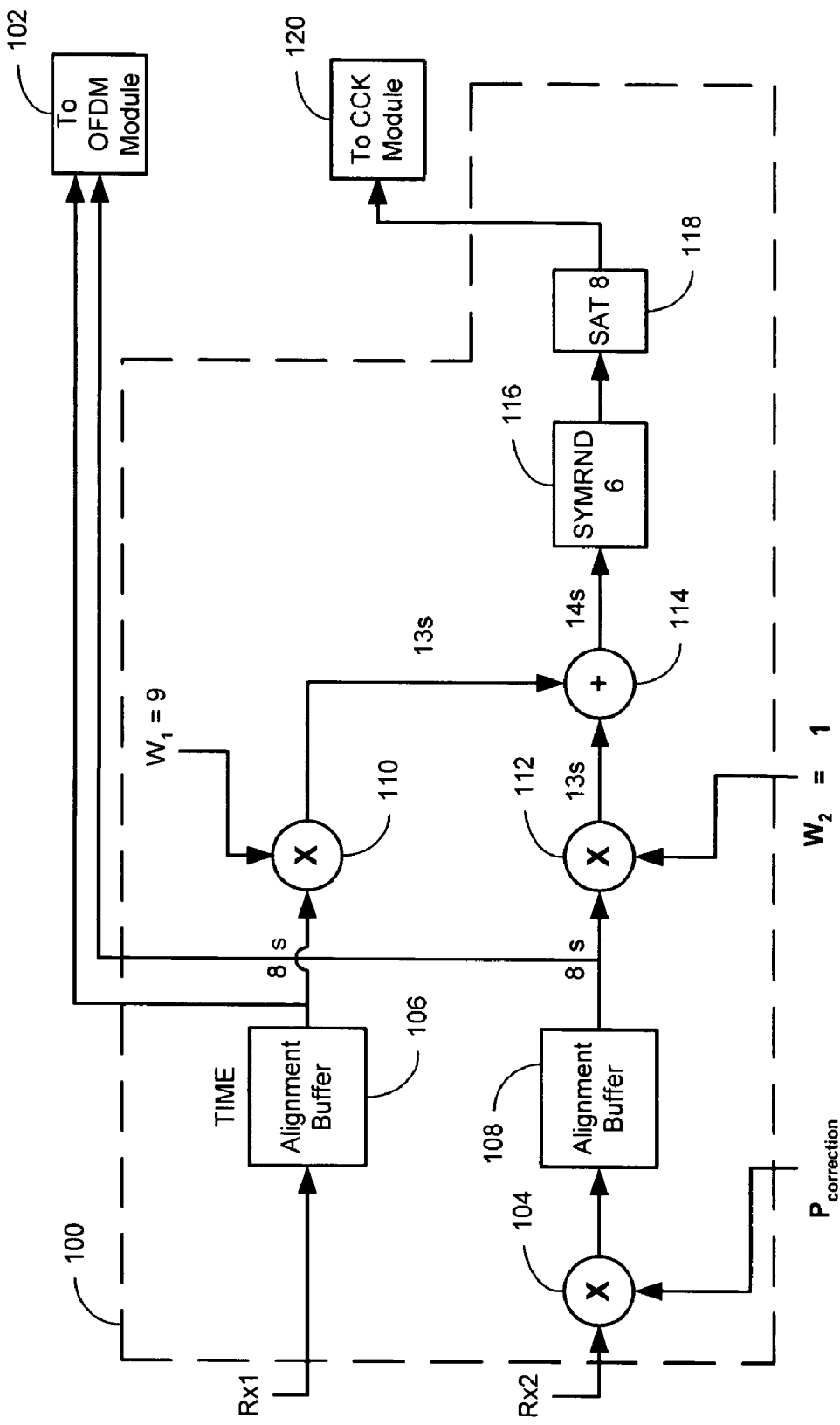
FIG. 4 shows a time domain complementary code keying (CCK) MRC module, in accordance with an embodiment of the present invention.

Referring now to FIG. 4, a time domain CCK MRC module 100 is shown to include a multiplier 104, two alignment buffers 106 and 108, two multipliers 110 and 112, a summation junction 114, a division module 116, and a saturation module 118, in accordance with an embodiment of the present invention. Also shown in FIG. 4 is an OFDM module 102 and a CCK module 120.

The multiplier 104 is coupled to the alignment buffer 108 which is coupled to the multiplier 112 and the OFDM module 102. The alignment buffer 106 is coupled to the multiplier 110 and the OFDM module 102. The multipliers 110 and 112 are coupled to the summation junction 114 which is coupled to the division module 116. The division module 116 is coupled to the saturation module 118 which is coupled to the CCK module 120.

The multiplier 104 receives a second CCK modulated signal which is phase corrected at the multiplier 104 using the phase offset (P. The phase corrected signal is transferred to the alignment buffer 108. A first CCK modulated signal is received by the alignment buffer 106 to be time aligned. The outputs of the alignment buffers 106 and 108 are first and second aligned signals that are transferred to the OFDM module 102 for demodulation and to the two multipliers 110 and 112, respectively.

The first aligned signal is multiplied by $W_1$ at the multiplier 110 and the second aligned signal is multiplied by $W_2$ at the multiplier 112 to generate two scaled outputs which are added at the summation junction 114 to generate an adjusted signal. The adjusted signal is divided by 2 (shift right) at the division module 116 and subsequently saturated to 8 bits at the saturation module 118. The 8-bit output of the saturation module 118 is transferred to the CCK module 120 for demodulation.

Figure 5:
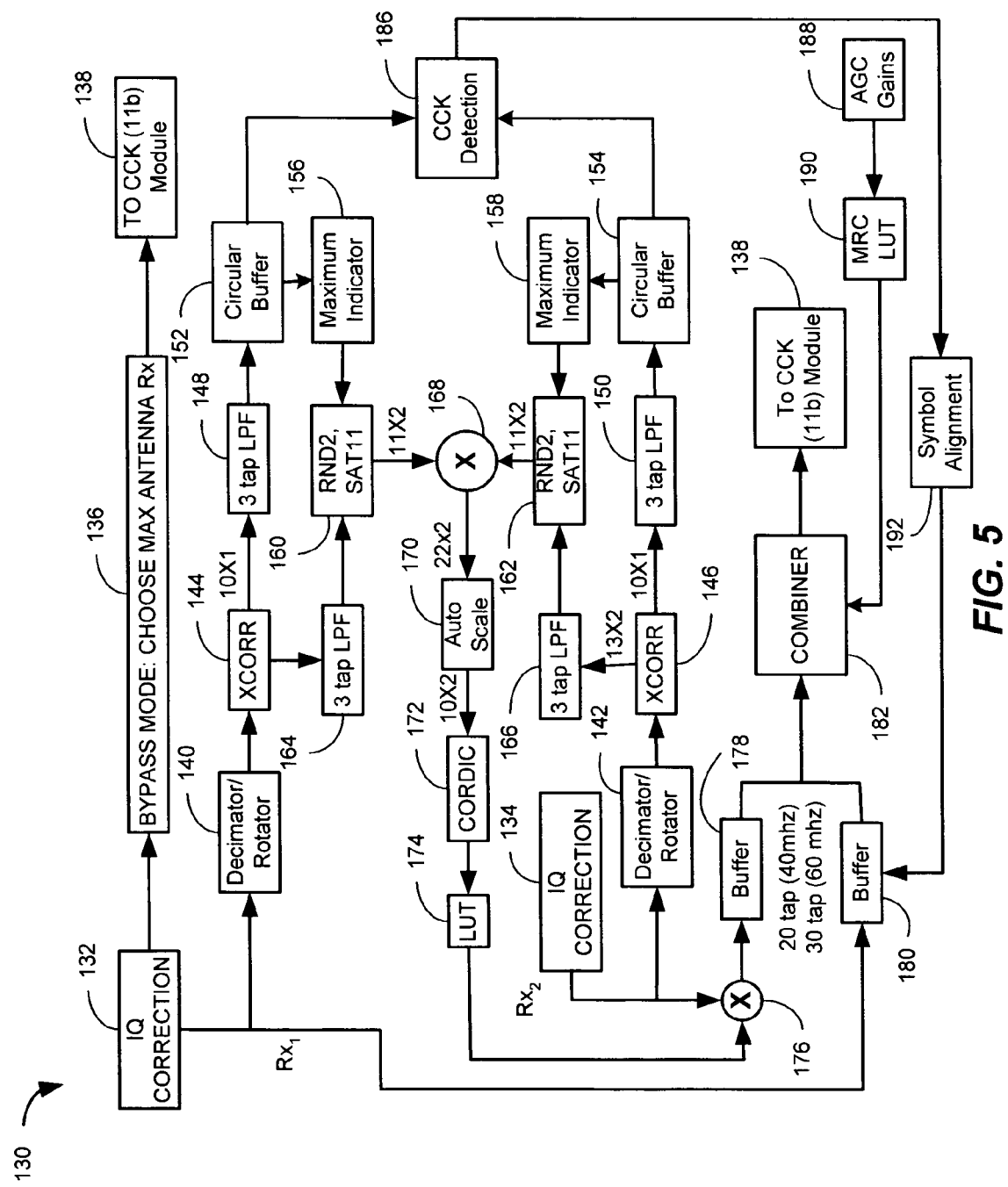
FIG. 5 shows a functional block diagram of the SYNC module and the time domain CCK MRC module, in accordance with an embodiment of the present invention.

Referring now to FIG. 5, a functional block diagram 130 of the SYNC module and the time domain CCK MRC module for processing the CCK modulated signals is shown to include two in-phase and quadrature (IQ) correction modules 132 and 134, two rotator modules 140 and 142, two cross correlators 144 and 146, four low pass filters (LPF) 148, 150, 164, and 166, two circular buffers 152 and 154, two maximum indicators 156 and 158, two saturation modules 160 and 162, two multipliers 168 and 176, an auto scale module 170, a Coordinate Rotation Digital Computer (CORDIC) 172, a look-up table (LUT) module 174, two buffers 178 and 180, a combiner 182, a CCK module 138, a CCK detection module 186, an AGC gains module 188, an MRC LUT module 190, a symbol alignment module 192, and a maximum antenna module 136, in accordance with an embodiment of the present invention.

The IQ module 132 is coupled to the rotator module 140 and the buffer 180 which is coupled to the combiner 182 which is coupled to the CCK module 138. The IQ correction module 134 is coupled to the rotator module 142 and the multiplier 176 which is coupled to the buffer 178 which is coupled to the combiner 182. The IQ correction module 132 is also coupled to the maximum antenna module 136 which is coupled to the CCK module 138.

The rotator module 140 is coupled to the cross correlator 144 which is coupled to the LPF's 148 and 164. The LPF 148 is coupled to the circular buffer 152 which is coupled to the CCK detection module 186 and the maximum indicator 156 which is coupled to the saturation module 160 which is coupled to the multiplier 168. The LPF 164 is coupled to the saturation module 160.

The rotator module 142 is coupled to the cross correlator 146 which is coupled to the LPF's 150 and 166. The LPF 150 is coupled to the circular buffer 154 which is coupled to the CCK detection module 186 and the maximum indicator 158 which is coupled to the saturation module 162 which is coupled to the multiplier 168. The multiplier 168 is coupled to the auto scale module 170 which is coupled to the CORDIC 172 which is coupled to the look-up table module 174 which is coupled to the multiplier 176. The CCK detection module 186 is coupled to the signal alignment module 192 which is coupled to the buffer 180. The AGC gains module 186 is coupled to the MRC LUT module 190 which is coupled to the combiner 182.

Under some circumstances, such as debugging, processing in the time domain may be totally bypassed. That is, by setting control register settings the CCK modulated signal corresponding to the maximum antenna, as determined by the maximum antenna module 136, is sent directly to the CCK module 138 without performing any adjustment in time domain.

Time adjustment of the CCK modulated signals is accomplished using the contents of the circular buffers 152 and 154. Specifically, the two CCK modulated signals, transferred to the rotator modules 140 and 142 are aligned using the peak locations of the signals in the circular buffers 152 and 154. The relative peak locations are retrieved if CCK modulation is detected in the CCK detection module 186. Upon detecting CCK modulation the two CCK modulated signals are time aligned in the signal alignment module 192 using the buffer 180 therefrom the aligned signals are transferred to the combiner 182 for gain scaling as discussed hereinabove. Time alignment is performed after the two CCK modulated signals have been phase adjusted.

After time alignment and phase adjustment, gain scaling is performed on the two aligned signals using the MRC weights generated by the AGC gains module 188 and the MRC LUT module 190. The MRC weights are applied to the aligned signals in the combiner 182.

Phase adjustment of the CCK modulated signals is performed by rotating the second CCK modulated signal, $R_{x2}$ in FIG. 5, so that the phase thereof is essentially equal to the phase of the first CCK modulated signal $R_{x1}$. Phase rotation is computed using the complex output of the cross correlators 144 and 146 corresponding to the peak locations detected in the circular buffers 152 and 154, respectively. When the peak locations are detected in the circular buffers 152 and 154, the corresponding complex values that are the outputs of the LPF's 148 and 150, respectively, are latched. Accordingly, two latched values are generated at the maximum indicator modules 156 and 158. The IQ correction modules 132 and 134 correct gain, orthogonality and delay offset between the in-phase and quadrature components of the complex signals.

At the completion of two complete 11-bit preamble symbols, the two latched values are rounded and saturated at the saturation modules 160 and 162 and multiplied together at the multiplier 168. Multiplication is performed using the conjugate of $R_{x1}$ as discussed hereinabove. The output of the multiplier 168 is auto scaled at the auto scale module 170 to 10 bits to generate an auto-scaled output. The auto-scaled output is processed by the CORDIC 172 to generate a CORDIC output which is used by the look-up table module 174 to look-up the 10-bit phase offset. The phase offset is multiplied by $R_{x2}$ at the multiplier 176 to generate a phase-adjusted signal which is transferred to the buffer 178.

Figure 6:
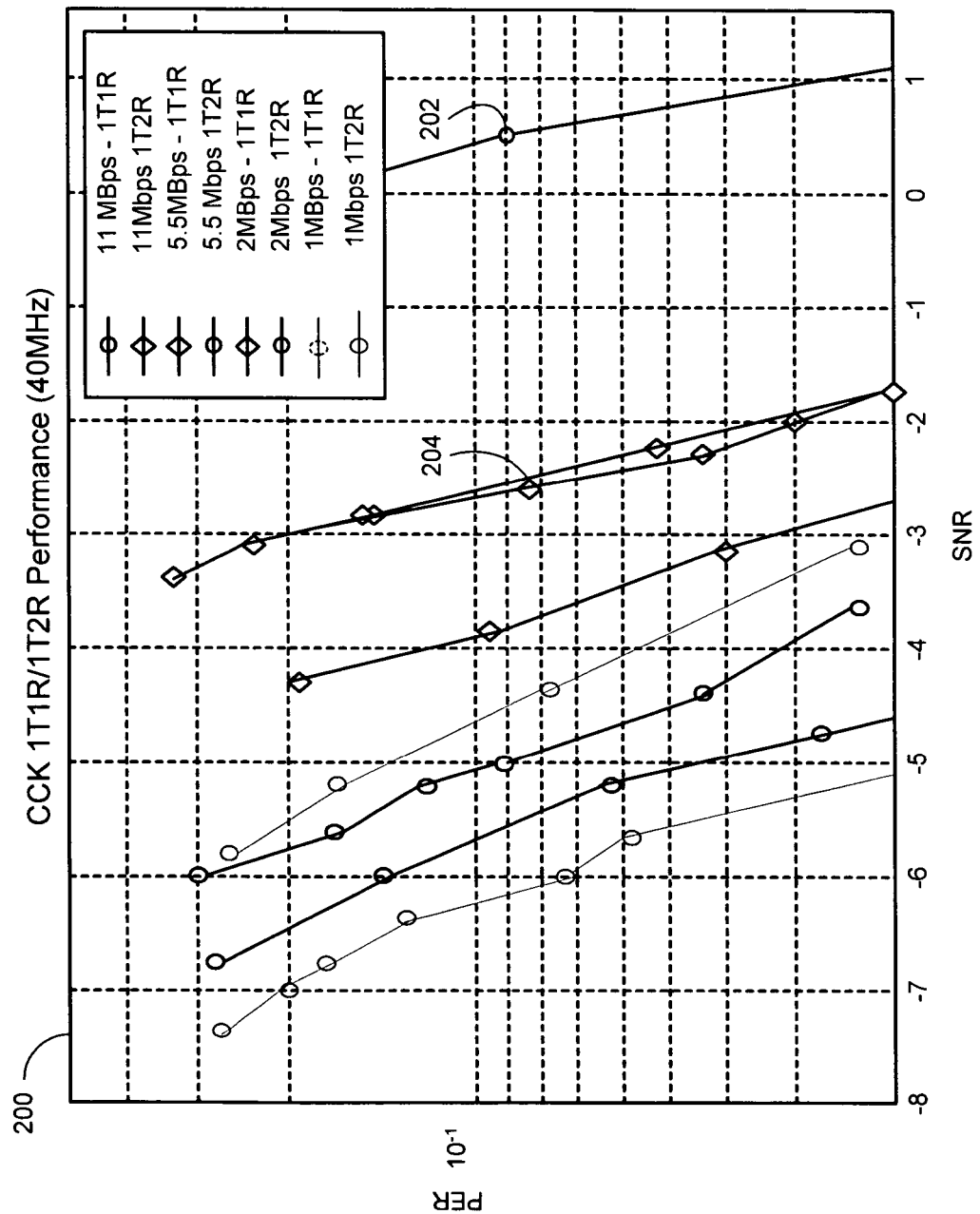
FIG. 6 shows a CCK performance graph for a one-transmitter two-receiver (1T2R) system, in accordance with an embodiment of the present invention.

Referring now to FIG. 6, a CCK performance graph 200 for a 1T2R system is shown, in accordance with an embodiment of the present invention. The graph 200 has signal to noise ratio (SNR) on the horizontal axis in decibels (dB) and packet error rate (PER) on the vertical axis. The graph is generated using a 40 MHz simulator. The performance improvement for the 1T2R CCK MRC receiver over the conventional one transmitter one receiver (1T1R) system under additive white Gaussian noise (AWGN) condition is particularly significant for higher data rates. For example, in the case of 11 megabits per second (MBps) the difference between the points 202 and 204 is approximately 3.1 dB. A summary of results for a plurality of data rates is as follows:

| | |
|---|---|
| 11 MBps | 3.1 dB |
| 5.5 MBps | 2.4 dB |
| 2.0 MBps | 1.6 dB |
| 1.0 MBps | 1.5 dB |

Figure 7:
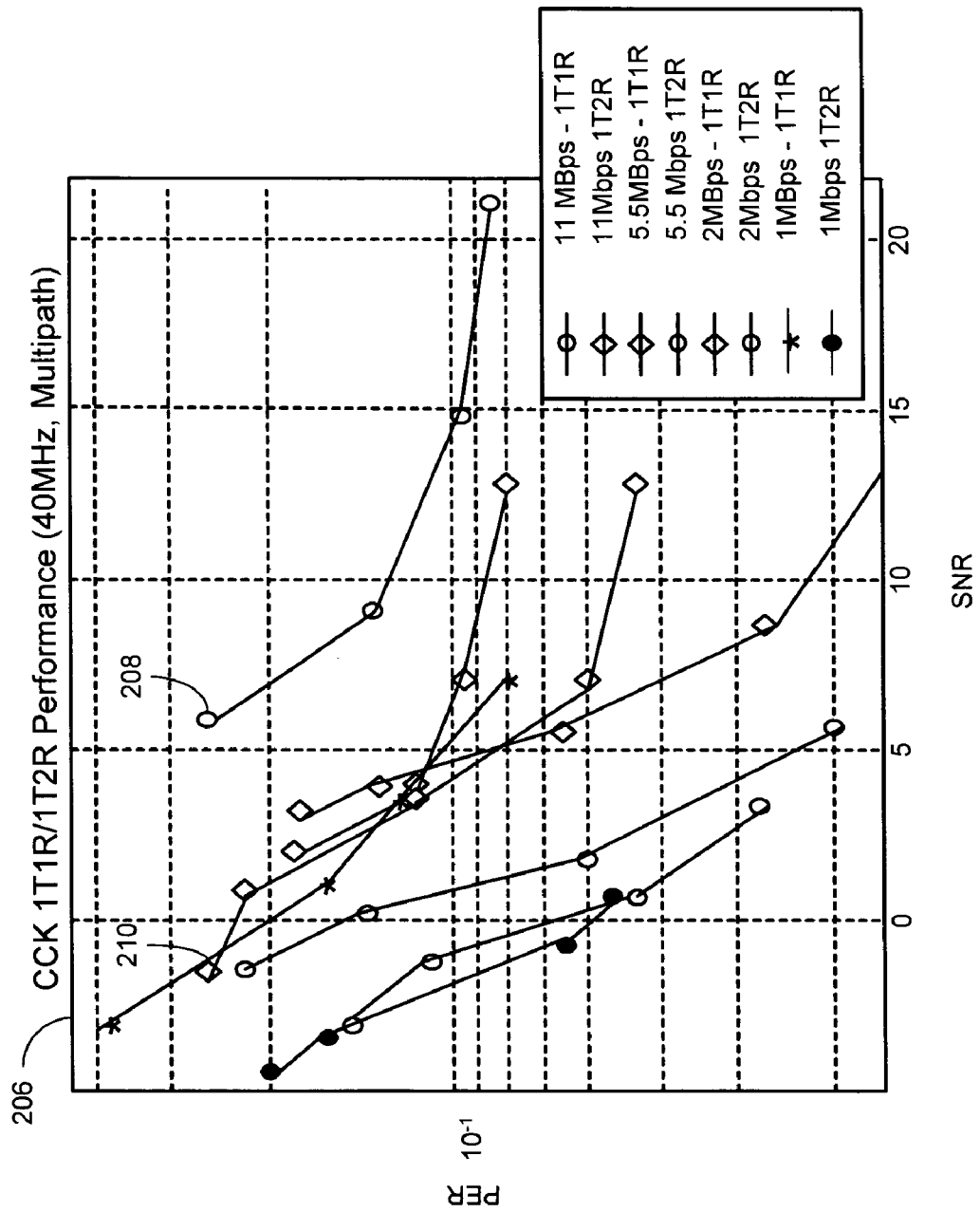
FIG. 7 shows a CCK performance graph for a 1T2R system with multi-path, in accordance with an embodiment of the present invention.

Referring now to FIG. 7, a CCK performance graph 206 for a 1T2R system using multi-path conditions is shown, in accordance with an embodiment of the present invention. Multi-path conditions are a better representation of the realistic channel conditions. The graph 206 has SNR in dB on the horizontal axis and PER on the vertical axis. The performance improvement for the 1T2R CCK MRC system over the 1T1R system is particularly significant for higher data rates. For example, for 11 MBps, the difference between the points 208 and 210 is approximately 8 dB. A summary of results for a plurality of data rates is as follows:

| | |
|---|---|
| 11 MBps | 8.0 dB |
| 5.5 MBps | 4.0 dB |
| 2.0 MBps | 5.0 dB |
| 1.0 MBps | 5.0 dB |

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A multi input multi output (MIMO) receiver for receiving signals comprising:
a synchronization (SYNC) module operative to receive a plurality of received baseband signals including orthogonal frequency division multiplexing (OFDM) modulated signals and time domain complementary code keying (CCK) modulated signals, said SYNC module being operative to align the OFDM modulated signals, in time domain, to generate aligned OFDM signals and further operative to generate maximum ratio combining (MRC) parameters said MIMO receiver for processing said plurality of aligned OFDM signals to generate a plurality of subcarriers;
a time domain CCK MRC module responsive to said MRC parameters for processing said CCK modulated signals in time domain to generate aligned signals, said aligned signals being combined to generate an adjusted signal for demodulation; and
a frequency domain OFDM MRC module responsive to said plurality of subcarriers for combining the same in the frequency domain to generate an equalized response for demodulation,
wherein said MIMO receiver for processing said CCK modulated signals in the time domain and said OFDM modulated signals in the frequency domain to improve reception of said plurality of received baseband signals by selecting the best channel conditions among the received baseband signals by combining the OFDM modulated signals on the basis of each subcarrier using varying MRC parameters optimized for each subcarrier.

2. A multi input multi output (MIMO) receiver as recited in claim 1 wherein said maximum ratio combining (MRC) parameters include a time offset and a phase offset, said time offset being used to align said complementary code keying (CCK) modulated signals and said orthogonal frequency division multiplexing (OFDM) modulated signals in time domain, said phase offset being used to adjust the phase of said CCK modulated signals in the time domain.

3. A multi input multi output (MIMO) receiver as recited in claim 2 wherein said synchronization (SYNC) module for computing the magnitudes of said plurality of received baseband signals, said plurality of received baseband signals including a first and a second received baseband signals, said time offset being the difference in time between the peak locations of the magnitudes of said first and second received baseband signals.

4. A multi input multi output (MIMO) receiver as recited in claim 3 for processing said first and second received baseband signals to generate first and second complementary code keying (CCK) modulated signals, said time domain CCK maximum ratio combining (MRC) module for time aligning said first and second CCK modulated signals by translating said first CCK modulated signal in time with respect to said second CCK modulated signal to correct said time offset.

5. A multi input multi output (MIMO) receiver as recited in claim 3 for processing said first and second received baseband signals to generate first and second orthogonal frequency division multiplexing (OFDM) modulated signals, said synchronization module for time aligning said first and second OFDM modulated signals to generate two aligned OFDM signals in time domain, said first OFDM modulated signal being translated in time with respect to said second OFDM modulated signal to correct said time offset.

6. A multi input multi output (MIMO) receiver as recited in claim 4 for adjusting the phase between said first and second complementary code keying (CCK) modulated signals, said phase offset being computed by determining the angle of the product of said second CCK modulated signal having the largest magnitude with the conjugate of said first CCK modulated signal having the largest magnitude.

7. A multi input multi output (MIMO) receiver as recited in claim 5 further including one or more fast Fourier transform (FFT) modules being responsive to said aligned signals for converting the same into said plurality of subcarriers in the frequency domain.

8. A multi input multi output (MIMO) receiver as recited in claim 7 wherein said frequency domain orthogonal frequency division multiplexing (OFDM) maximum ratio combining (MRC) module for using 2 channel estimates for combining said plurality of subcarriers, said channel estimates for the $i^{th}$ subcarrier of said plurality of subcarriers being given by a 2×1 matrix according to $$H_i = [h^1 h^2]_i^T.$$

9. A multi input multi output (MIMO) receiver as recited in claim 8 wherein said frequency domain orthogonal frequency division multiplexing (OFDM) maximum ratio combining (MRC) module for using equalizer coefficients for combining said plurality of subcarriers, said equalizer coefficient for the $i^{th}$ subcarrier of said plurality of subcarriers being given according to $$F_i = H_i/|H_i|^2 = (|h^1|^2 + |h^2|^2)^{-1} [h^1 h^{2*}] = [Z^1 Z^2].$$

10. A multi input multi output (MIMO) receiver as recited in claim 9 wherein said frequency domain orthogonal frequency division multiplexing (OFDM) maximum ratio combining (MRC) module for combining 2 of said plurality of subcarriers denoted by $y^1$ and $y^2$ to generate an equalized response according to $$(Z^1 y^1 + Z^2 y^2)_i.$$

11. A multi input multi output (MIMO) receiver as recited in claim 4 further including one or more radio frequency (RF) modules being responsive to a plurality of received signals, said radio frequency modules for converting said plurality of received signals to said plurality of received baseband signals.

12. A multi input multi output (MIMO) receiver as recited in claim 11 wherein each of said radio frequency modules having an independent automatic gain control (AGC) setting, said independent AGC settings for allowing said MIMO receiver to use better quality channel information, said independent AGC settings for said first and second complementary code keying (CCK) modulated signals being denoted by $G_1$ and $G_2$ respectively.

13. A multi input multi output (MIMO) receiver as recited in claim 12 wherein said time domain maximum ratio combining (MRC) module for gain scaling said first and second complementary code keying (CCK) modulated signals, said time domain MRC module for computing two MRC weights $W_1$ and $W_2$ according to $$W_1 = G_2/(G_1+G_2),$$

$$W_2 = G_1/(G_1+G_2).$$

14. A multi input multi output (MIMO) receiver as recited in claim 13 wherein said aligned signals for including a first and a second aligned signal, said first aligned signal being multiplied by said $W_1$ to generate a first scaled output, said second aligned signal being multiplied by said $W_2$ to generate a second scaled output, said first and second scaled outputs being combined to generate said adjusted signal.

15. A multi input multi output (MIMO) receiver as recited in claim 1 wherein said synchronization (SYNC) module for including one or more cross correlators being responsive to digital input signals, said digital input signals for including said complementary code keying (CCK) modulated signals and said orthogonal frequency division multiplexing (OFDM) modulated signals, said cross correlators for distinguishing between said CCK modulated signals and said OFDM modulated signals.

16. A multi input multi output (MIMO) receiver as recited in claim 15 wherein said cross correlators for including orthogonal frequency division multiplexing (OFDM) modules and complementary code keying (CCK) modules, said OFDM modules for receiving said OFDM modulated signals, said CCK module for receiving said CCK modulated signals.

17. A multi input multi output (MIMO) receiver as recited in claim 16 wherein said synchronization (SYNC) module further including one or more analog to digital (AD) converters being responsive to said received baseband signals for converting the same to said digital input signals.

18. A multi input multi output (MIMO) receiver as recited in claim 1 for improving the signal to noise ratio (SNR) in reception of said complementary code keying (CCK) modulated signals, the signal to noise ratio being substantially improved for data rate of 11 Megabits per second (MBps).

19. A method for receiving signals comprising:
processing a plurality of received baseband signals to generate maximum ratio combining (MRC) parameters, complementary code keying (CCK) modulated signals and orthogonal frequency division multiplexing (OFDM) modulated signals;

using the MRC parameters to process the OFDM modulated signals to generate a plurality of aligned OFDM signals in time domain;

processing the plurality of aligned OFDM signals to generate a plurality of subcarriers;

processing the CCK modulated signals in time domain to generate aligned signals;

combining the aligned signals to generate an adjusted signal for demodulation; and combining the plurality of subcarriers in the frequency domain to generate an equalized response for demodulation.

20. A multi input multi output (MIMO) receiver for receiving signals comprising:
means for processing a plurality of received baseband signals to generate maximum ratio combining (MRC) parameters, complementary code keying (CCK) modulated signals and orthogonal frequency division multiplexing (OFDM) modulated signals;

means for using the MRC parameters to process the OFDM modulated signals to generate a plurality of aligned OFDM signals in time domain;

means for processing the plurality of aligned OFDM signals to generate a plurality of subcarriers;

means for processing the CCK modulated signals in time domain to generate aligned signals;

means for combining the aligned signals to generate an adjusted signal for demodulation; and means for combining the plurality of subcarriers in the frequency domain to generate an equalized response for demodulation.

21. A computer readable medium having stored therein computer readable program code comprising:
processing a plurality of received baseband signals to generate maximum ratio combining (MRC) parameters, complementary code keying (CCK) modulated signals and orthogonal frequency division multiplexing (OFDM) modulated signals;

using the MRC parameters to process the OFDM modulated signals to generate a plurality of aligned OFDM signals in time domain;

processing the plurality of aligned OFDM signals to generate a plurality of subcarriers;

processing the CCK modulated signals in time domain to generate aligned signals;

combining the aligned signals to generate an adjusted signal for demodulation; and combining the plurality of subcarriers in the frequency domain to generate an equalized response for demodulation.

* * * * *